United States Patent
Lammert, Jr. et al.

(10) Patent No.: US 11,587,129 B2
(45) Date of Patent: Feb. 21, 2023

(54) SYSTEMS AND METHODS FOR REMOTE REAL ESTATE INSPECTIONS AND VALUATIONS

(71) Applicant: Accurate Group, LLC, Independence, OH (US)

(72) Inventors: Thomas K. Lammert, Jr., Saxonburg, PA (US); Scott Waxman, Northbrook, IL (US)

(73) Assignee: Accurate Group, LLC, Independence, OH (US)

( * ) Notice: Subject to any disclaimer, the term of this patent is extended or adjusted under 35 U.S.C. 154(b) by 174 days.

(21) Appl. No.: 16/033,192

(22) Filed: Jul. 11, 2018

(65) Prior Publication Data

US 2019/0019261 A1 Jan. 17, 2019

Related U.S. Application Data

(60) Provisional application No. 62/558,075, filed on Sep. 13, 2017, provisional application No. 62/531,172, filed on Jul. 11, 2017.

(51) Int. Cl.

| | | |
|---|---|---|
| *G06Q 30/02* | (2012.01) | |
| *G06Q 50/16* | (2012.01) | |
| *G06F 7/02* | (2006.01) | |
| *H04N 5/232* | (2006.01) | |
| *G06F 16/58* | (2019.01) | |
| *G06V 20/00* | (2022.01) | |
| *G06Q 30/0201* | (2023.01) | |

(52) U.S. Cl.
CPC .......... *G06Q 30/0278* (2013.01); *G06F 7/02* (2013.01); *G06F 16/58* (2019.01); *G06Q 30/0201* (2013.01); *G06Q 50/16* (2013.01); *G06V 20/00* (2022.01); *H04N 5/232* (2013.01); *G06F 2216/03* (2013.01)

(58) Field of Classification Search
CPC .............. G06Q 30/0278; G06Q 50/16; G06Q 30/0201; G06K 9/00624; H04N 5/232
See application file for complete search history.

(56) References Cited

U.S. PATENT DOCUMENTS

| | | | | |
|---|---|---|---|---|
| 9,605,704 | B1 * | 3/2017 | Humphries | .......... G06Q 20/102 |
| 9,911,042 | B1 * | 3/2018 | Cardona | .............. G06K 9/6215 |
| 2009/0006185 | A1 * | 1/2009 | Stinson | .................. G06Q 10/10 705/306 |

(Continued)

OTHER PUBLICATIONS

Q. You, R. Pang, L. Cao and J. Luo, "Image-Based Appraisal of Real Estate Properties," Dec. 2017, in IEEE Transactions on Multimedia, vol. 19, No. 12, pp. 2751-2759. (Year: 2017).*

(Continued)

*Primary Examiner* — Sarah M Monfeldt
*Assistant Examiner* — Michael J. Monaghan
(74) *Attorney, Agent, or Firm* — K&L Gates LLP

(57) ABSTRACT

The present disclosure provides computerized, automated real estate valuation systems and methods that take into account subjective factors of the property like curb appeal and property condition. In preferred embodiments, the valuation system uses image recognition of images (photos and/or videos) associated with the property to automatically identify which comparable properties to include and to exclude in determining the value of the property.

20 Claims, 4 Drawing Sheets

(56) References Cited

U.S. PATENT DOCUMENTS

| | | | | |
|---|---|---|---|---|
| 2013/0103597 A1* | 4/2013 | Fout | ................... | G06Q 50/16 |
| | | | | 705/313 |
| 2013/0339094 A1* | 12/2013 | Berry | ................... | G06Q 50/16 |
| | | | | 705/7.34 |
| 2014/0279572 A1* | 9/2014 | Coats | ................ | G06Q 30/0278 |
| | | | | 705/306 |
| 2015/0228037 A1* | 8/2015 | Wu | ................... | G06Q 50/16 |
| | | | | 705/313 |
| 2016/0012510 A1* | 1/2016 | Binder | ................ | G06F 16/29 |
| | | | | 705/26.64 |
| 2016/0048934 A1* | 2/2016 | Gross | ................ | G06K 9/4642 |
| | | | | 705/313 |
| 2016/0092959 A1* | 3/2016 | Gross | ................ | G06Q 30/0276 |
| | | | | 705/26.62 |
| 2016/0292800 A1* | 10/2016 | Smith | ................ | G06Q 50/16 |
| 2016/0307243 A1* | 10/2016 | Ghosh | ................ | G06Q 50/165 |
| 2017/0031952 A1* | 2/2017 | D'Souza | ........... | G06Q 30/0631 |
| 2018/0130152 A1* | 5/2018 | Holbrook | ......... | G06Q 30/0205 |

OTHER PUBLICATIONS

Poursaeed, O., Matera, T. & Belongie, S., "Vision-based real estate price estimation", Apr. 3, 2018, Machine Vision and Applications 29, pp. 667-676. (Year: 2018).*

* cited by examiner

SYSTEMS AND METHODS FOR REMOTE REAL ESTATE INSPECTIONS AND VALUATIONS

CROSS-REFERENCE TO RELATED APPLICATIONS

This application incorporates by reference and claims the benefit of priority to U.S. Provisional Application 62/531,172 filed on Jul. 11, 2017, and U.S. Provisional Application 62/558,075 filed on Sep. 13, 2017.

BACKGROUND OF THE INVENTION

The present subject matter relates generally to systems and methods for real estate inspections and systems and methods for real estate valuations. It is contemplated that each system may be implemented separately or, in some instances, that a single real estate platform may encompass the features and functions of each system.

Both appraisals (i.e., valuations) and inspections of real estate are commonly in real estate transactions, whether in the construction industry, public safety actions, public health operations, national borders customs enforcement, military settings, real estate sales, market research, scientific investigations, and marketing and behavioral studies.

First addressing valuations, many factors influence the value of a parcel of real estate, from the readily quantifiable attributes of a piece of property (e.g., the square footage, number of bathrooms, etc.) to more subjective and/or fluid factors which influence real estate values (e.g., sale prices of other homes in a given area, construction of new amenities near-by, the housing market as a whole, etc.).

In many ways, computerized systems are uniquely capable of accounting for the wealth of information which influences the calculation of real estate values. Prior computerized real estate valuation systems excelled at accounting for the physical dimensions of a property, its fixtures and features, as well as its close by amenities. However, these factors leave out what, according to many industry guides and websites, are perhaps two of the most important factors which impacts property value—curb appeal and property condition.

Curb appeal is typically understood as the attractiveness of a property and its surroundings when viewed from the street. Factors such as the quality of the property's landscaping, the appearance of the front entrance, and the condition of the paint and/or siding can have large impacts on curb appeal. Prior appraisal systems rarely accounted for such information.

Property condition generally includes levels of deferred maintenance and updating or modernization which has occurred. Again, prior appraisal systems rarely accounted for such information.

Most valuation systems required a professional appraiser to evaluate the condition and appearance of a property in person to determine its true value. This adds to the expense and may cause delays in coordinating the evaluation by the professional appraiser.

The previous software systems that accounted in some manner for curb appeal and/or property condition factors did so in less than optimal ways. For example, some prior systems allowed for the addition of photos, etc. to aid in property valuation, but required a professional appraiser to view the information and assign the information a value, which added cost to the home valuation process and provided little to no advantages over a traditional appraisal.

Further, none of the systems mentioned above account for real-time factors that might influence property values, such as other valuations of homes by computerized systems or feedback from actual home buyers.

Accordingly, there is a need for a computerized, automated, real estate valuation systems and methods that more accurately and efficiently account for curb appeal and condition and provide the ability to account for real-time valuation factors.

In addition to valuations, real estate transactions often require, or otherwise benefit from, an inspection. Typically, as inspection requires physical and visual documentation of the premise with exact measurements and evidencing the condition of the property. Such inspections are conventionally performed by licensed or unlicensed home inspectors, realtors, appraisers, and/or otherwise trained inspectors. In most instances, both inspectors and appraisers are required to be independent, i.e., have no personal or business interest in the property or transaction.

Inspections can substantiate or add value to other methods of valuation, such as, for example, Automated Valuation Models, Evaluations, and Desk-top Appraisals. An appraiser may visit the property and make the inspection and take photographs directly or supervise another appraiser or trainee who performs the inspection in the presence of the appraiser. Similarly, a real estate broker may conduct an in-person inspection in developing a broker price opinion (BPO). An appraiser, bank officer, or other qualified person for conducting an evaluation may also need to physically inspect the property. By their nature, Desk-top Appraisals and AVMs are typically developed without physical inspection or by engaging a third-party to conduct an inspection.

When someone other than the professional who is developing the appraisal or valuation inspects the property, there is a need to obtain verification that the inspection was properly conducted, documented, and that all submitted photographs fairly represent the characteristics and condition of the property. Typically, the production of a valuation and/or inspection may be time-sensitive. For example, certain valuations and inspections need to be completed timely in order to close a loan based on the valuation. In some instances, there is a need to confirm the condition of a property as of a specific date (e.g., for other real estate owned portfolio valuation). Further, inspections and valuations have become increasingly difficult and expensive as a consequence of demographic changes among the available real estate appraisers and shortages of appraisers.

Accordingly, there is a need for inspection systems and methods that enable the completion of an independent inspection without the appraiser, bank officer, or realtor being physically present at the property.

BRIEF SUMMARY OF THE INVENTION

The present disclosure provides systems and methods for providing real estate inspections and valuations. Various examples of the systems and methods are provided herein.

This disclosure provides two distinct systems (an inspection system and a valuation system) each of which includes features and functions than can be combined in one or more ways with the features and functions of the other system. The first system is directed to computerized, automated real estate valuation system that takes into account subjective factors of the property like curb appeal and property condition (the "valuation system"). In preferred embodiments, the valuation system uses image recognition of images (photos and/or videos) associated with the property to automatically identify which comparable properties to include and to exclude in determining the value of the property. The second system is directed to a mobile application that enables a remote user (not at the premises to be evaluated) to direct a local user (at the premises to be evaluated) to properly conduct a property inspection (the remote inspection system). In other words, the inspection system enables an independent, remotely-situated person to supervise, conduct, or participate in a property inspection sufficiently to establish verifiable independence.

In an example in which elements of both of the systems are combined into a single platform, the data (e.g., photos, videos, measurements, etc.) from the remote inspection system can be used as data input to the valuation system. For example, one or more of the photos collected through the remote inspection system can be used to evaluate the curb appeal, quality of materials, and measurements of the property by the valuation system. In addition, the data obtained via the remote inspection system can be used to help identify similar properties to be used in the valuation system. In still another example, the two systems may operate independently, but be aspects of a single, integrated, real estate valuation and inspection system.

Turning first to the valuation system, the system may feature one or more databases of data concerning attributes of real estate listings. Such data may detail physical dimensions, fixtures, and features of a piece of property and also include images of the property (e.g., photographs or videos of the interior and exterior of the property). This information may be recorded for current real estate listings on the market, as well as for previously sold properties. The system may utilize both data mining and image recognition software to analyze the data stored for each property to generate data points that can be compared amongst present and previous real estate listings to then automatically generate a value for a piece of real estate.

The readily quantifiable information about a piece of real estate may be entered into the system via a front-end software graphical user interface (GUI) utilized by an end user or automatically loaded into the system via connection to an external database or data source containing real estate data. One such example of an external database that may be used by the valuation system is that of a multiple listing service (MLS), which is a primary data source used by real estate brokers and realtors to share information about properties for sale or those previously sold.

The pictures utilized by the valuation system may be uploaded by an end user utilizing a smartphone camera or other digital image capturing means. Pictures of the property for sale may, like the MLS data mentioned above, also be automatically provided to the valuation system by connection to an external database or data source for analysis by the system. Examples of sources of photographs include Google Street View, satellite images, and various real estate web sites and listings. Accordingly, the valuation system may automatically, through communication with these external databases, collect contemporaneous and valuable image data regarding a specific piece of real estate.

A goal of the valuation system is to provide a computerized, automated system that generates automated valuation models (AVMs) that account for the condition of a property. At present, some systems have added property inspection as a factor in generation of an AVM, but this property inspection data has not accounted for subjective factors like curb appeal, nor has the property inspection data been used for comparison between properties.

An advantage of the valuation system is that it provides an accurate value for a piece of property without the need for a specialized professional to appraise the property. Presently, even with the wealth of digitized information and pictures of properties present online, there is a need for a professional appraiser to evaluate the condition and appearance of a property to determine its true value. Such a process can be time consuming and the need for a specialist acts as a rate limiting factor when attempting to sell a piece of real estate. Using data mining and image recognition, the present system can generate a highly accurate price for a property without the need for human intervention—saving both time and costs.

Additionally, another advantage of the valuation system is that it is less subjective than work done by a human appraiser and can be scaled quickly from small scale (e.g., comparing homes in a neighborhood) all the way out to national or international scales seamlessly. Home buying trends can change quickly, and the present system can be updated automatically to account for such trends, faster than is humanly possible and greatly reducing the incidence of human bias.

Turning now to the remote inspection system, the present systems and methods address the shortcomings of the conventional inspection and appraisal methods by enabling remote supervision and participation in a third-party inspection. For example, the physically present party may be a property owner, realtor for a party to a loan transaction, loan officer, or any other person granted access to the property. The remote inspection system allows the local party, who may or may not have an interest in the property or transaction, to physically move through the property to record required data (measurements, conditions, observations, photos, etc.) while being directed and supervised by an independent remote party not present at the property. Therefore, the present system establishes independence while also allowing the inspection to be performed more efficiently, timely, and cost effectively.

In addition to embodiments in which a person physically present at the property is guided by a remote party to collect the necessary photographs, measurements, etc., variations of the systems and methods described herein include an inspection using a drone-like robotic device that can be airborne or capable of traveling across the floor and up and down stairs, wherein the movement of the robotic device is controlled by the independent remote party, either directly or by giving direction to the local person.

The remote inspection system can include a mobile application that enables a remote person (not at the premises) to direct a local person (at the premises to be evaluated) to complete the necessary inspection steps, including various required measurements, text input, video and photos that the user can collect, which can be supervised, reviewed and received by the remote independent person in real-time. In an example, the remote person can direct the local user through the application with respect to the position, lighting, and other parameters to obtain adequate photos or video in real-time. For example, the remote independent party can direct the local user, while viewing the exterior or interior of the property through the application, as to what to photograph, film, measure, how to position the device and its camera, and otherwise observe the property as though present in order to effectively conduct the inspection and establish independence of any interest of the local user. For example, the application can indicate with a light or sound that confirms the camera is in the correct position for the correct photo. Alternatively, or in addition to, the remote independent party can control the camera capabilities of the mobile device to obtain the correct photographical data.

In one example, a method of generating a valuation for real estate property includes: assigning a quantitative score representing an assessed condition of a first property for which a valuation is to be generated; assigning a quantitative score representing an assessed desirability of a location of the first property; assigning a quantitative score representing an assessed condition of each of a plurality of other properties; assigning a quantitative score representing an assessed desirability of a location of each of the plurality of other properties; determining a first subset of the plurality of the other properties by comparing the quantitative score representing the assessed condition of the first property and the quantitative score representing the assessed desirability of a location of the first property to the quantitative score representing the assessed condition of each of the plurality of the other properties and the quantitative score representing the assessed desirability of the location of each of the plurality of the other properties, wherein the quantitative scores of the other properties included in the first subset more closely match the quantitative scores of the first property than the other properties excluded from the first subset; applying an image recognition algorithm comparing one or more images of the first property against one or more images of each of the plurality of the other properties in the first subset to determine a second subset of the plurality of the other properties, wherein the visual characteristics of the other properties included in the second subset more closely match the visual characteristics of the first property than other properties excluded from the second subset; and using the second subset of other properties to generate a valuation for the first property.

Each of the quantitative scores may be a numerical score between 1 and 5.

The steps of assigning the quantitative scores may be completed manually or automatically without human intervention by a controller in a computing device.

The steps of assigning the quantitative scores may be completed automatically without human intervention by a controller in a computing device using a text mining algorithm to assess textual data related to the first property and each of the plurality of other properties.

The one or more images of the first property and the one or more images of each of the plurality of the other properties include one or more photos and/or one or more videos.

The step of determining a first subset of the plurality of the other properties may further include text mining additional details related to the first property and each of the plurality of other properties to further assess similarity between the first property and each of the plurality of other properties.

The additional details may include a number of bedrooms, a number of bathrooms, a gross living area measurement, etc.

The assessed conditions may be interior conditions, exterior conditions, or combinations thereof. The assessed conditions may include a quality of materials used in construction, damage and repairs, etc.

In some examples, the image recognition algorithm may compare one or more internal images of the first property against one or more internal images of each of the plurality of the other properties. In other examples, the image recognition algorithm may compare one or more external images of the first property against one or more external images of each of the plurality of the other properties. In still further examples, the image recognition algorithm compares one or more internal images of the first property and one or more external images of the first property against one or more internal images of each of the plurality of the other properties and one or more external images of each of the plurality of the other properties.

The one or more of the images are automatically collected from existing image databases and/or may be manually collected by a user capturing images on premise.

In one embodiment, a system for valuing an evaluated property includes: a computer device including a controller and memory coupled to the controller, wherein the memory is configured to store program instructions executable by the controller; wherein in response to executing the program instructions, the controller is configured to: receive property data associated with the evaluated property, wherein the property data includes interior property data, exterior property data, and location data; calculate a property score for the evaluated property condition based on the property data; retrieve a plurality of comparable property data, wherein the comparable property data matches at least one of the property data; and generate a property valuation report based on the score and the property data and the plurality of comparable property data.

At least one of the interior property data and the exterior property data may be a photo or video. The interior property data and the exterior property data may include a determined quality of materials. The interior property data and the exterior property data may include a history of damage, repairs, or combinations thereof.

The controller may be further configured to retrieve market influences related to the evaluated property, wherein the market influences can include at least one of a school district, neighborhood sale trend, and national real estate trends; and the property score may be based on the market influences.

The comparable property data may be selected by matching the location data with the evaluated property location. The comparable property data may further include a sale price for each comparable property, wherein the property valuation report generates a monetary value for the evaluated property using the sale prices of the comparable properties.

At least a portion of the property data may be received from a remote mobile device, wherein the remote mobile device includes visual data capabilities via a camera application. In such systems, the controller may be configured to manipulate the camera application within in the mobile device to capture photographic data associated with the inspection site and receive the captured photographic data from the mobile device.

In another embodiment, the system for evaluating an evaluated property includes: a computer device including a controller and memory coupled to the controller, wherein the memory is configured to store program instructions executable by the controller; wherein in response to executing the program instructions, the controller is configured to: receive audio and visual communication from a remote mobile device, wherein the remote mobile device includes visual data capabilities via a camera application; manipulate, via the controller, the camera application within in the mobile device to capture photographic data associated with the evaluated property; and receive the captured photographic data from the mobile device.

The computer device may be physically distinct from the mobile device. The photographic data may include a photo, a video, or combinations thereof of the inspection site. The photographic data may include at least one of a time stamp, and a geotag obtained via a GPS system within the mobile device.

The manipulation of the camera application within in the mobile device may include selecting a photo mode, a video mode, or combinations thereof. The manipulation of the camera application within in the mobile device may include controlling the camera operations from the computer device. The manipulation of the camera application within in the mobile device may include editing the photographical data. The manipulation of the camera application within in the mobile device may include editing the photographical data before the controller receives the photographic data.

The controller may be further configured to generate an inspection report associated with the inspected site. The controller may be configured to generate a property valuation report associated with the inspected site, wherein the evaluation report includes an estimated property value based on the photographic data.

The controller may further be configured to retrieve a plurality of comparable property data, wherein the comparable property data matches at least one of the property data, wherein the generated property valuation report is based on the photographic data and the plurality of comparable property data.

An advantage of the valuation and remote inspection systems is providing independently developed, verifiable, timely, and economical home and real estate inspections and valuations. Specifically, the system enables an independent, remotely-situated person to supervise, conduct or participate in a property inspection sufficiently to establish verifiable independence. Conventionally, it has not been possible to complete inspections without the inspector traveling to the property and performing the inspection at the property.

A further advantage of the of the valuation and remote inspection systems is providing real estate valuation and inspection wherein an interested party can physically perform the inspection in communication with an independent party so as to meet independence requirements.

Another advantage of the remote inspection system is providing self-authenticating photographical data, wherein each photo and video includes geotags and time stamps.

Another advantage of the valuation and remote inspection systems is providing a timely valuation and inspection without having to be delayed until an independent party can physically be present at the premises.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The present disclosure provides systems and methods for providing home and real estate inspections and valuations. Various examples of the systems and methods are provided herein.

The present system can include a centralized controller (e.g., processor embodied in a computing device, such as, for example, a server) that receives data from both external data sources and end user devices. The centralized controller receives and stores information concerning real estate, including photographs and/or other visual media specially associated with the various properties. The centralized controller may host one or more software programs that, when implemented, provide one or more graphical user interfaces (GUIs) to end users through devices in communication with the centralized controller. Through these GUIs, end users can upload photos and data regarding real estate parcels, as well generate and review reports generated by the system, distribute these reports to others via email, SMS, social media, web site postings, etc.

The end user devices can be stationary or mobile computing devices (e.g., laptops, desktops, smartphones, and tablets). Any computing device capable of browsing, providing, and/or capturing real estate data may be utilized as part of the present system. As will be described in further detail herein, smartphones and tablets which have built in cameras may be utilized by end users to capture photos of a piece of property along with other information concerning a property to generate a real-time property valuation.

The external data sources may be a single or multiple external databases or data sources, websites, or even databases run by another instance of the system (with the system being capable of using anonymized data for valuation generation where desirable or necessary). The external data sources can include one or more multiple listing service databases, real estate websites, classified listings, etc. Photographs of a given piece of property may be obtained from the databases/data sources mentioned above and also image websites such as Google Earth™ and/or Street View™ or any other reliable source of property photos.

The pairing of photographic media (or other visual media) to the real estate data is essential to some of the features and functions described herein and enables the system to create improved automated valuations of properties that more accurately account for factors such as curb appeal and property condition.

Figure 1:
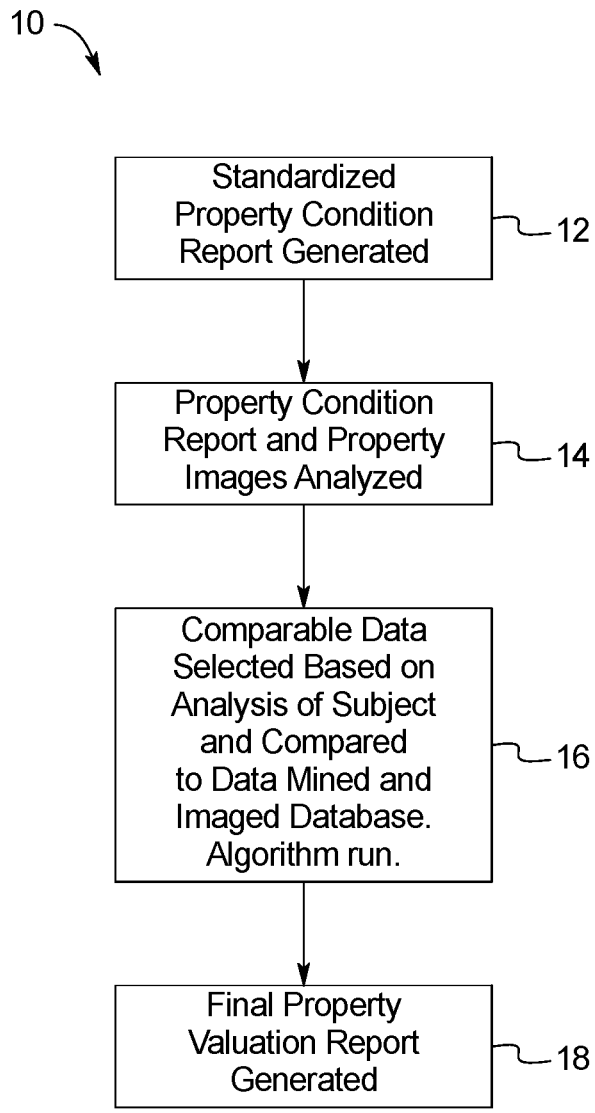
FIG. 1 is a flow chart illustrating how an automated real estate valuation system generates a finalized property valuation report.

FIG. 1 is a flow chart of an example of a process 10 for the generation of a property valuation report for a given piece of real estate. In a first step 12, a standardized property condition report (PCR) is generated for the piece of real estate. The system utilizes a predefined set of characteristics and scores to produce consistent data sets for each property in the system. Uniform evaluation enables for more efficient comparison of properties. In one example, several different sets of characteristics are available to the system for generation of the property condition report. For example, data points related to the characteristics of the exterior of a property only, exterior/interior characteristic data points, or exterior/interior/property footprint data points may be utilized by the system depending on the data available.

The individual data points examined by the system may include, but are not limited to: exterior condition, interior condition, positive and negative market influences, gross living area measurement, quality of materials used in construction, and damage/repairs. No matter the data points used, the system generates a score for the condition of the property and a score for the location of the property. In this example, such scores are designated as: 1=Poor, 2=Below Average, 3=Average, 4=Above Average, 5=Excellent. Thus, each piece of real estate analyzed is given a PCR that includes a numerical ranking of the condition of the property and a numerical ranking of the location of the property. It is recognized that the numerical ranking used herein is not limited to a 1 to 5. Any range of numerical ranking may be used, as will be recognized by those skilled in the art.

Once the PCR scores are generated, the PCR scores are used in combination with visual image data for the property to find the most relevant comparable valuation data available in the system. In order to find the most relevant comparable valuation data, in a second step 14, image recognition and comparison algorithms are run against visual image data of the real estate (photographs, video, etc.) as compared to visual image data of other real estate stored in the system. The results of the image recognition and comparison algorithms are then used, in a third step 16, to identify the most relevant property sales for the currently analyzed property.

Thus, the properties to be used as a basis for valuing the property are selected by first limiting the scope of the comparable properties based on the PCR scores (e.g., by a numerical score of the condition of the property and a numerical score of the by location of the property), and then further limiting the scope of the comparable properties to those that most closely match the visual characteristics of the property, as identified through image recognition techniques. Accordingly, the system may take a large data set of properties for which it has both PCR scores and one or more images and very quickly and efficiently, automatically, without human intervention, reduce the set of properties to those most relevant set of comparable properties for determining the property value.

Utilizing the sale price of the identified set of most closely comparable properties (identified using the image recognition and comparison algorithms in combination with the PCR scores), the system then generates a finalized valuation report in a final step 18. The finalized valuation report may be generated as an .XML file, .PDF file, etc., and/or displayed to an end user via the system's GUI, as well as stored in the system for comparisons in future valuations.

Figure 2:
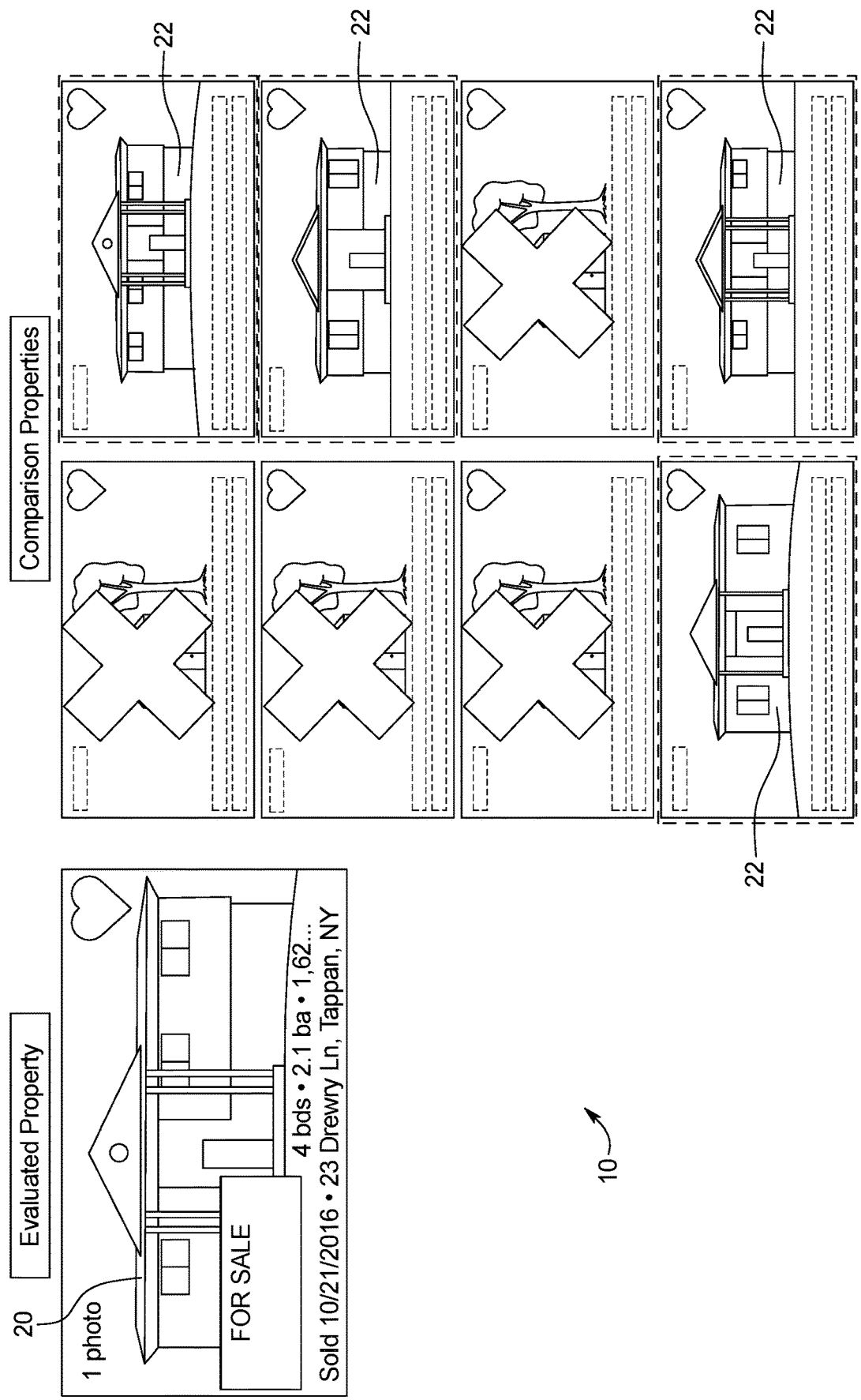
FIG. 2 is a diagram illustrating an automated real estate valuation system analyzing property listings using image recognition software.

FIG. 2 is a diagram illustrating aspects of the second step 14 and third step 16 in process 10. As described above, the automated real estate valuation system analyzes multiple property listings using image recognition software to identify the most closely related real estate to be used in the valuation process.

As shown in FIG. 2, once a PCR report is complete for an evaluated property 20, the system 10 identifies a number of comparative properties that match closely to the evaluated property 20 to produce a set of comparable properties 22. The initial pass can be made automatically, without human intervention, using a text mining algorithm that mines the PCR scores and/or addition to details about the real estate, such as number of bedrooms, number of bathrooms, physical location, amenities, etc. The system then uses image recognition and comparison algorithms to further refine the data set to establish a final set of comparable properties 22.

For example, in FIG. 2, the system is examining a home in Tappan, N.Y. Using PCR scores and other quantitative data for each property (number of bedrooms, number of bathrooms, etc.), the system first text mines the data set to generate a list of eight comparative homes (although this number could be much larger) which were sold in Tappan, N.Y. The text mining algorithm, much like the image recognition algorithm, can be used to identify key words which identify attributes (GLA, lot size, amenities, etc.) that the previous sale listings have in common with the presently evaluated property 20. At this stage in the process, the homes that are identified as having similar amenities to the examined property (the text mining algorithm may be refined to require varying degrees of similarity) will not all have the same, or similar, physical exterior characteristics. The system 10 then applies the image recognition and comparison algorithms to the eight comparative homes to identify four of the eight homes that have sufficiently similar exterior physical characteristics in common with the home being evaluated to be used as reference points for generating a more accurate valuation. These final four comparative homes are referred to herein as the final set of comparable properties 22.

For example, the search for comparable properties 22 may start with a pool of one thousand comparative sales, which are then refined to two hundred fifty located in the immediate market location, then refined to one hundred based on property characteristic parameters, then refined to 50 based on PCR scores, and then finally refined down to a final set of twenty-five comparable properties 22 based on visual similarity. The sale value of the twenty-five comparable properties are then analyzed to generate a value for the presently evaluated property 20.

Figure 3:
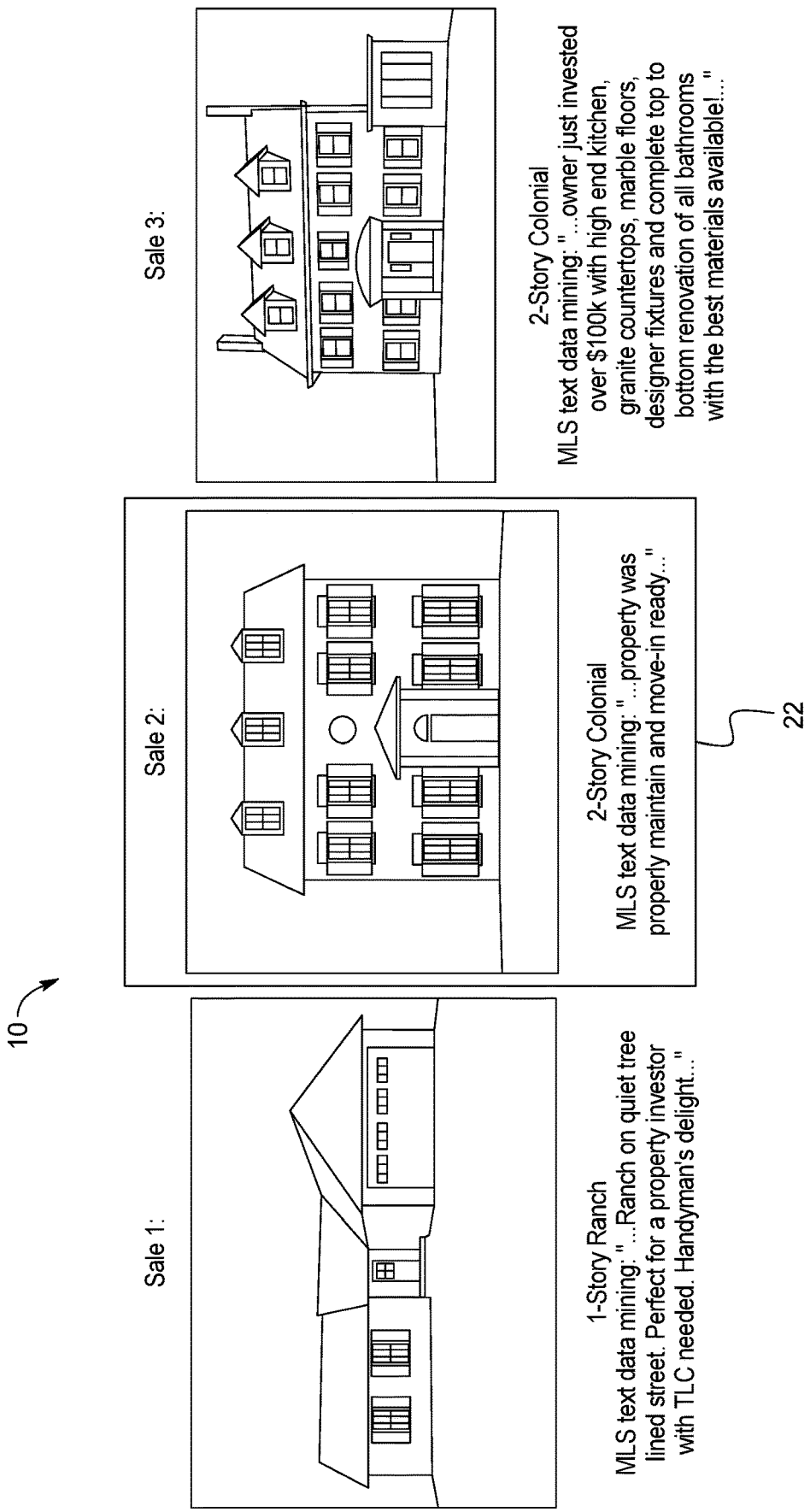
FIG. 3 is a diagram which illustrates how the automated real estate valuation system filters out properties that are not suited for comparison.

FIG. 3 is a diagram illustrating an example of how the automated real estate valuation system 10 can filter properties that are not suited for use as comparable properties 22. The evaluated property 20 shown in FIG. 2 as being evaluated by the system is a two-story home with normal (non-high end) fixtures, but which has been kept in good repair. Such information is noted by the system 10 via the use of a combination of PCR scores, image recognition software, and/or data obtained from an external database (MLS data specifically). When searching through home listings in the area, such attributes enable the system to eliminate Sale 1 (a single-story fixer upper) and Sale 3 (a two-story home with high end fixtures), as neither of these homes are as close a match as Sale 2 (a two story well maintained home which is move-in ready), as shown in FIG. 3.

It should be noted that in addition to the use of external photographs of the homes, it is fully conceptualized and realized that the system may also account for internal photos of various fixtures and amenities of a home via the use of photo recognition software to automatically generate extremely accurate valuations.

Figure 4:
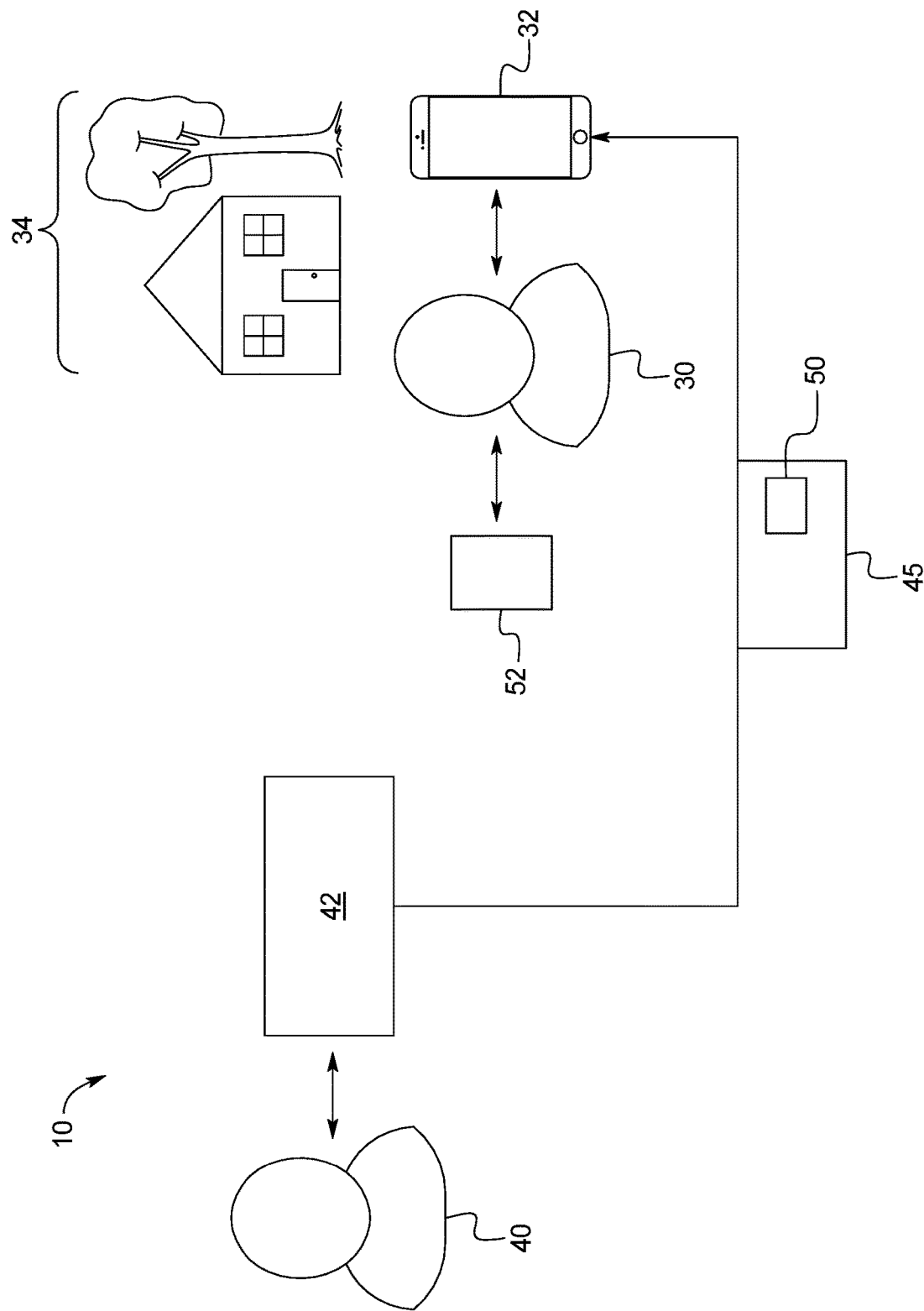
FIG. 4 is a schematic of an example of the system including a local party and remote party interacting with the system to perform an evaluation and/or inspection.

Turning now to the example shown in FIG. 4, the present systems and methods provide a remote property inspection system which further enables remote supervision and participation in a third-party valuation and/or inspection where the physically present party may be an interested party otherwise excluded from conducting an inspection (such as, for example, a property owner, a realtor for a party to a loan transaction, a loan officer) or any other person granted access to the property. The present system 10 allows the local party 30 in possession of a mobile device 32, who may or may not have an interest in the property 34 or transaction, to physically move through the property 34 to record required data (measurements, conditions, observations, photos, etc.) while being directed, supervised, and in communication with an independent remote party 40 not present at the property 34. In an example, the mobile device 32 is in communication with a controller 40 in communication with the remote party 40, wherein the controller can control the functionality of the mobile device 32. The system can include a mobile application downloaded to a mobile device 32 in possession of the local party 30, wherein the mobile device 32 can be a telephone, mobile phone, smartphone, PDA, computer, among others.

The independent third-party (e.g., remote party 40) can observe the evaluated property 34 through the mobile device 32 and direct the local party 30 present at the property 34 through the mobile device 32 by instructing the person on how to position the mobile device 32 for correct photos and the exact locations within the property 34 to be used for the required measurements. The independent third-party (e.g., remote party 40) can instruct the local party 30 in real-time. In an example, the independent third-party (e.g., remote party 40) can view the property 34 in real-time through the mobile device 32 handled by the local party 30 via the camera functionality. As a result, the independent third-party (e.g., remote party 40) can direct the inspecting party (e.g., local party 30) on how to position the camera in real-time to capture the correct photo or video needed to verify the inspection.

By enabling real-time audio and visual communication between the remote independent party 40 and the local party 30 present at the property 34, the remote party 40 is able to view the entire property 34, request that items be moved or adjust lighting, direct the use of the measurement tools in the device, confirm GPS location, and otherwise use the local party 30 present at the property 34 or the robotic device as a physical extension of the remote person 40. Further, the system 10 includes the mobile device 32 in possession of the local party 30 at the property 34 sending or automatically uploading the collected data 45 including and all measurements, text, descriptions, etc., wherein the collected data 45 can include photographic data 50 including photos, videos, among others, to a computer device associated with the remote party 40.

The system 10 can include a wireless communication network. The mobile device 32 can be a bi-directionally communication coupled to a wireless transponder. The system 10 can include a transmission system that can include the Internet, a telephony network, and can be or comprise continuous electrically connective optic fibers, communication cabling, and additional wireless communications transponders and linking wireless communication networks. The mobile device 32 can include audio and video-capture cellular capabilities. In such example, the independent third-party (e.g., remote party 40) can communicate (e.g., text, audio, video) in real-time with the local party 30.

The system 10 can include at least one measurement tool 52 (physical and/or electronic) capable of aiding in various required measurements. The measurement tool 52 can include a distance reference, e.g., ruler, yardstick, etc. The measurement tool 52 can include a laser, radar, or similar technologies to measure interior and exterior dimensions. The measurement tool 52 may either be separate from the mobile device 32 or it may integral to the mobile device 32.

The system 10 can also include a GPS geotagging technology for confirming location of the mobile device 32 and recording it with the video and photographs. As a result, the photos and measurements can be geotagged, thus ensuring additional authenticity.

The remote mobile device 32 and/or robotic device can include a time date real-time clock that provides a time date stamp data that can be coupled to all obtained and recorded data, such as the photographs, videos, measurements, among others. The communication session between the remote party 40 and the local party 30 in possession of the mobile device 32 may be set at a predetermined time or according to a pre-established schedule.

In an example, the system 10 can include an application feature within the mobile device 32 that allows the remote independent third-party 40 to adjust and control the flash and other photographic functionality of the mobile device 32, e.g., resolution, aperture, zoom, sound levels, shutter priority, exposure, white balance, frames per second, etc. In an example, the remote party 40 can control the mobile device 32 through a remote computer device including a controller 42, including any computer device such as desktop computer, laptop computer, tablets, smartphones, mobile device, among others.

The system 10 can enable or comprise the establishment of a communications session wherein video data is transmitted from a mobile device at an inspected site of interest to the remote computer. The system 10 can include a graphic user interface ("GUI") that may be applied by either or both the mobile device and the remote computer. The GUI may enable the remote independent party to impose a visual cursor and/or icon within a video image being rendered by the mobile device.

Further, any and all data generated in a communications session, to include video data, textual data, audio data and GUI data, may be recorded and stored in a database in communication with the remote computer device having the controller 42. Optionally, additional data may be recorded and stored within, associated with, or associable with, and earlier or later recorded session record.

For example, the communication can include a real-time, live video stream that can be captured by the mobile device 32 and/or the controller in communication with the remote party 40. Further, the remote party 40 can edit and download photos and video clips (e.g., photographic data 50) from the live stream directly to a database in communication with the controller 42 without downloading the data on the mobile device 32 in possession of the local party 30.

The present system 10 allows the mobile device 32 via the present application to have two-party sound and visual communication through the mobile device 32 while allowing the remote party 40 to access and control the camera, sound, and controls of the mobile device 32. For example, the remote party 40 can control the camera and recording functions of the mobile device 32 through a remote computer and is able to view, manipulate, and control the photo, video, measurement, and editing capabilities of the mobile device 32 in real-time. The remote computer device having controller 42 can include software programs and data sufficient to control the mobile device 32 to enable the provision of necessary services within the computer device 42 for execution of various application software within the mobile device 32. The computer device 42 can be enabled to capture, store, and modify the graphic data, video data, and alphanumeric data from the mobile device 32 in real-time.

For example, the system 10 can include editing and sketching tools that allow floor plans or diagrams of the inspected premises to be drawn during the inspection or from the video/photographic record made during the inspection. Such editing and sketching can be performed and controlled by the remote party 40 in real-time to the data that is obtained by the mobile device 32, before or after the photographic data is sent or downloaded to the controller 42. In other words, the remote party 40 can edit, via the controller 42, the photographic data 50 directly on the remote mobile device 32 before sending or downloading the photographic data from the mobile device 32.

In an example, the text, images, audio, and video data (e.g., photographic data 50) captured by the mobile device 32 can be imported into a database in communication with the computer device 42 controlled by the remote party 40. The imported data 45 can be tagged with a premises identifier and used to generate an appraisal or inspection report.

In addition, the application can include a pre-established evaluation task list for the remote party 40 in proximity to the mobile device 32. For example, the task list can include a number of steps, rules, or regulations for the local party 30 to accomplish. The steps can include tasks that are required for compliance with the standard inspection rules and regulations.

Alternatively, or in addition to the mobile device 32 shown in FIG. 4, the system 10 can include a robotic device 32 that can move through the property, controlled by an independent remote party 40 to capture the necessary data. In an example, the device 32 can move on the ground and up and down stairs. The device 32 may alternatively fly through the premise. The robotic device 32 can include a camera with photo and video capabilities to capture the required photos and allow real-time observation by the remote party 40 to clearly present the condition of the premises. The independent remote party 40 can control the robotic device 32 and/or communicate with the mobile device 32 through cellular and/or Internet capabilities of the mobile device 32.

As previously noted, the photographic data 50 captured by the system 10 may be used in the system 10 to assist in the valuation system described with reference to FIGS. 1-3. Using independent inspection data across a wide range of properties to further refine real estate valuations may provide a significant benefit over the use of exterior photographs, for example those provided via Google Earth™.

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A method of generating a valuation for real estate property comprising:
   assigning a condition quantitative score representing an assessed condition of a first property for which a valuation is to be generated;
   assigning a desirability quantitative score representing an assessed desirability of a location of the first property;
   assigning a comparative condition quantitative score representing an assessed condition of each of a plurality of other properties;
   assigning a comparative desirability quantitative score representing an assessed desirability of a location of each of the plurality of other properties;
   automatically comparing, without human intervention by a controller in a computing device, the condition quantitative score of the first property with the comparative condition quantitative scores of the plurality of other properties;
   automatically comparing, without human intervention by the controller, the desirability quantitative score of the first property with the comparative desirability quantitative scores of the plurality of other properties;
   automatically determining, without human intervention by the controller, a first subset of the plurality of other properties refined from the plurality of other properties based on the comparison of the condition quantitative score and the comparative condition quantitative scores and the comparison of the desirability quantitative score and the comparative desirability quantitative scores;
   upon determining the first subset of the plurality of other properties based on the comparison of the condition scores and the comparison of the desirability scores, automatically comparing, without human intervention by the controller, visual characteristics of one or more images of the first property with visual characteristics of one or more images of each other property in the first subset using an image recognition algorithm;
   in response to comparing the visual characteristics, determining, without human intervention by the controller, a second subset of the plurality of other properties refined from the first subset of other properties based on the image recognition; and
   automatically using, without human intervention by the controller, the second subset of other properties to generate a valuation for the first property.

2. The method of claim 1 wherein each of the quantitative scores are a numerical score between 1 and 5.

3. The method of claim 1 wherein assigning the condition, desirability, comparative condition, and comparative desirability quantitative scores comprises manually assigning the condition, desirability, comparative condition, and comparative desirability quantitative scores.

4. The method of claim 1 wherein assigning the condition, desirability, comparative condition, and comparative desirability quantitative scores comprises automatically assigning the condition, desirability, comparative condition, and comparative desirability quantitative scores without human intervention by the controller in a computing device.

5. The method of claim 1 wherein assigning the condition, desirability, comparative condition, and comparative desirability quantitative scores comprises automatically assigning the condition, desirability, comparative condition, and comparative desirability quantitative scores without human intervention by the controller in a computing device using a text mining algorithm to assess textual data related to the first property and each of the plurality of other properties.

6. The method of claim 1 wherein the one or more images of the first property and the one or more images of each of the plurality of the other properties include one or more photos.

7. The method of claim 1 wherein the one or more images of the first property and the one or more images of each of the plurality of the other properties include one or more videos.

8. The method of claim 1 wherein the step of determining a first subset of the plurality of the other properties further includes text mining additional details related to the first property and each of the plurality of other properties to further assess similarity between the first property and each of the plurality of other properties.

9. The method of claim 8 wherein the additional details include a number of bedrooms and a number of bathrooms.

10. The method of claim 9 wherein the additional details further include a gross living area measurement.

11. The method of claim 1 wherein the assessed conditions are exterior conditions.

12. The method of claim 1 wherein the assessed conditions are interior conditions.

13. The method of claim 1 wherein the assessed conditions are interior and exterior conditions.

14. The method of claim 1 wherein the assessed conditions include a quality of materials used in construction.

15. The method of claim 1 wherein the assessed conditions include damage and repairs.

16. The method of claim 1 wherein the image recognition algorithm compares one or more internal images of the first property against one or more internal images of each of the plurality of the other properties.

17. The method of claim 1 wherein the image recognition algorithm compares one or more external images of the first property against one or more external images of each of the plurality of the other properties.

18. The method of claim 1 wherein the image recognition algorithm compares one or more internal images of the first property and one or more external images of the first property against one or more internal images of each of the plurality of the other properties and one or more external images of each of the plurality of the other properties.

19. The method of claim 1 in which one or more of the images are automatically collected from existing image databases.

20. The method of claim 1 in which one or more of the images are manually collected by a user capturing images on premise.

* * * * *